Patented May 22, 1923.

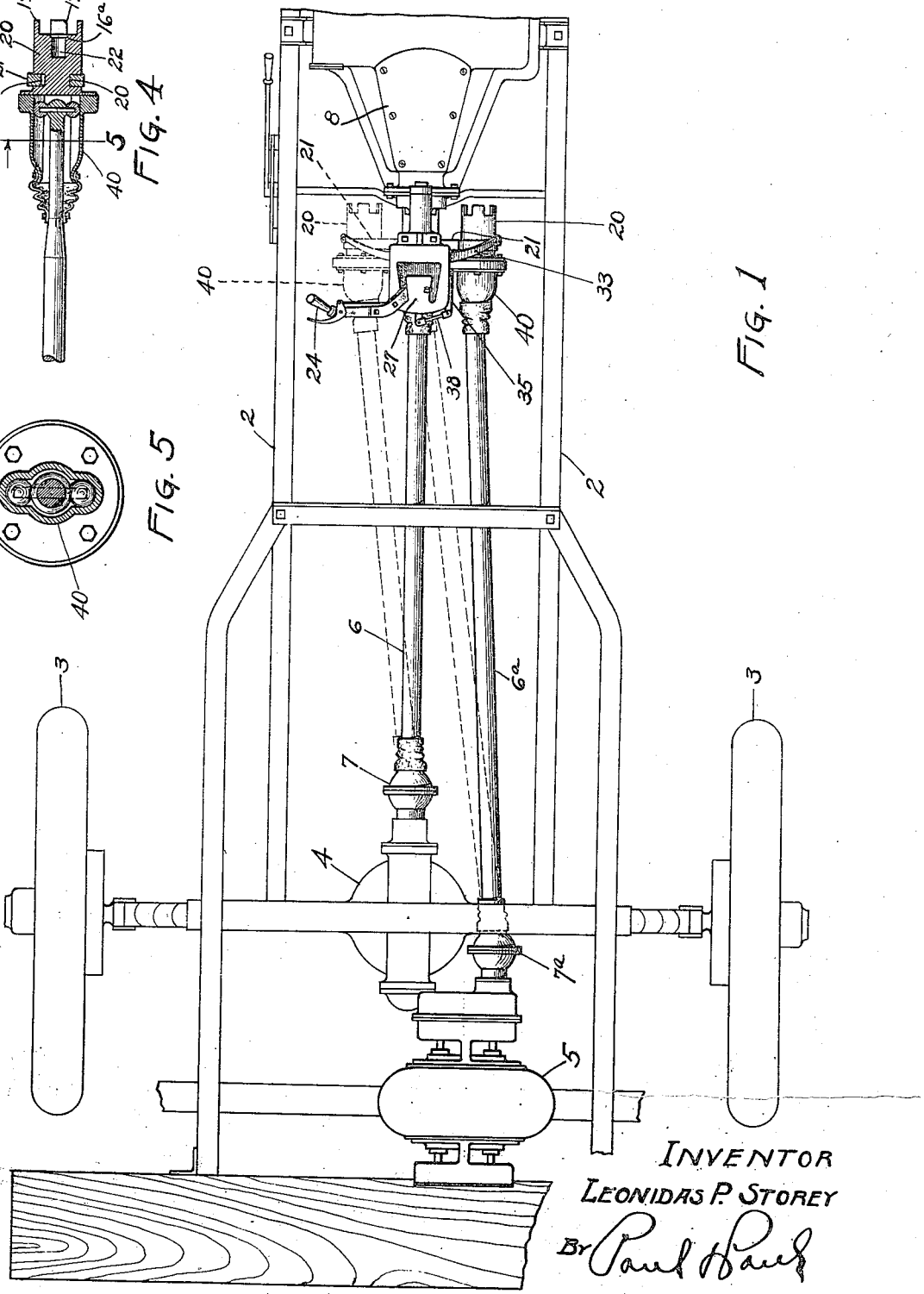

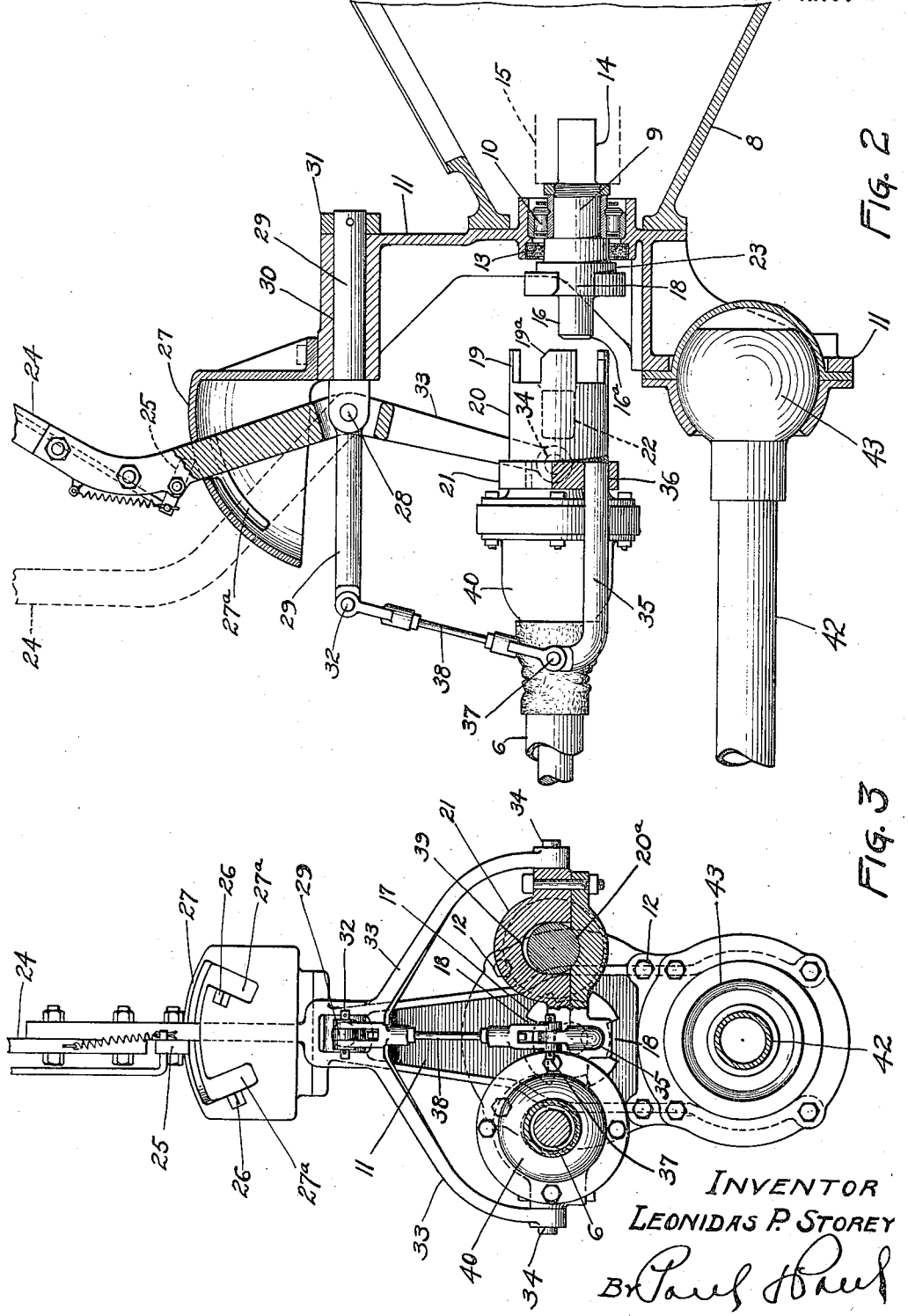

1,456,289

UNITED STATES PATENT OFFICE.

LEONIDAS P. STOREY, OF ST. PAUL, MINNESOTA, ASSIGNOR TO WATEROUS FIRE ENGINE CO., OF ST. PAUL, MINNESOTA, A CORPORATION OF MINNESOTA.

CLUTCH-SHIFTING MECHANISM.

Application filed April 8, 1922. Serial No. 550,760.

*To all whom it may concern:*

Be it known that I, LEONIDAS P. STOREY, a citizen of the United States, resident of St. Paul, county of Ramsey, State of Minnesota, have invented certain new and useful Improvements in Clutch-Shifting Mechanism, of which the following is a specification.

My invention relates particularly to clutch shifting mechanism for automobile fire engines, and the object of the invention is to provide mechanism by means of which the power of the engine can be easily and quickly shifted from the differential and the road driving mechanism to the pump when the engine has been stationed at a hydrant, or other water supply, and be as readily transferred to the differential, and the road driving mechanism, when it is desired to stop the pump and change the position of the engine, or return it to the fire house.

A further object is to provide a shifting mechanism controlled by the movement of a single lever, operating in one direction to shift the power from the differential to the pump and in the other direction to shift the power from the pump back to the differential.

Other objects of the invention will appear from the following detailed description.

This invention consists generally in various constructions and combinations, all as hereinafter described and particularly pointed out in the claims.

In the accompanying drawings forming part of this specification,

Figure 1 is a plan view of the rear portion of the chassis of an automobile fire engine, showing my invention applied thereto, Figure 2 is a sectional elevation of the clutch shifting mechanism, Figure 3 is a transverse sectional view of the clutch shifting mechanism showing the operating lever in its neutral position, Figure 4 is a sectional view through the connection between the yoke and drive shaft, Figure 5 is a sectional view on line 5—5 of Figure 4.

In the drawings, 2 represents the frame of the machine, having carrying wheels 3 and a differential housing 4, of ordinary construction. 5 is a pump, mounted on the rear portion of the frame. Drive shafts 6 and 6ª are connected with the differential and pump by universal joints 7 and 7ª, respectively, to allow a limited lateral movement of said shafts in the operation of the shifting mechanism. These shafts I will hereafter refer to as the differential drive shaft and pump drive shaft.

At the forward end of the frame is a transmission 8 connected with the engine in any suitable or preferred manner, which I have not thought it necessary to illustrate herein.

Referring to Figure 2, 9 is a transmission shaft rotatably mounted on a roller bearing 10 in a bracket 11 secured to the rear end of the transmission case 8 by bolts 12. 13 is a packing ring seated in the bracket 11 to prevent dust from getting into the bearing. The shaft 9 is provided at one end with a squared portion 14 fitting into a square socket in a transmission shaft 15 of usual construction, which I have shown only by dotted lines. At the opposite end of said shaft a centering dowel 16 and a clutch member 17, preferably integral with the shaft, are provided, said clutch member having notches 18 to receive teeth or jaws 19 on the other clutch member 20, rotatably mounted in bearings 20ª in the yoke 21, as shown in Figure 3. The clutch member 20 is provided with socket 22 to receive the dowel 16 when the clutch members are thrown into engagement with each other. A shoulder 23, concentric with the shaft 9, and of substantially the same diameter as the inside diameter or bore of the jaws 19, is provided on the clutch member 17, which serves as a centering means for the clutch member 20 when thrown into engagement with the clutch member 17, thus providing a positive centering means for keeping the clutch in perfect alignment during the operation of the differential or the pump.

An operating or control lever 24 having a dog 25 arranged to engage lugs 26 on a quadrant 27 is pivotally mounted at 28 on a shaft 29 rotatably mounted in a suitable bearing 30 in the bracket 11, said shaft having a collar 31 secured thereon to retain it in said bearing. The shaft 29 forms the axis of oscillation of the control lever and the clutch members supported thereby. The rearward end of the shaft 29 is preferably provided with an eye 32 arranged to lie on the same horizontal line as the pivot 28 of the operating lever 24. The lower portion of said lever is preferably provided with a fork 33 to which the yoke 21 is pivoted at 34. A finger or rod 35 is secured to the yoke at 36 and is provided with an eye 37 to which one end of a connecting link 38 is pivoted, the other end of said link being pivoted at 32 on the shaft 29. The rear end of the rod 35 is preferably curved upwards, as shown in Figure 2, to bring the pivot 37 on the same horizontal line as the pivots 34 in the yoke 21. Also the horizontal distance between the centers or pivots 28 and 32, and 34 and 37 are equal, and therefore form a linkage parallelogram, thereby retaining the clutch members 20 in a true horizontal position when out of engagement with the clutch member 17.

To compensate for the up and down movement of the clutch members 20 due to the arc of travel in its forward and rearward movement, I prefer to provide the bearings 20ª in the yoke 21 with a clearance, as shown at 39. I also prefer to chamfer the corners of the jaws 19 as shown at 19ª and the corner 16ª of the dowel 16 to facilitate the clutch member 20 locating its seat on the clutch member 17. It is readily seen that when one clutch member 20 is moved forward to engage the clutch member 17, it is also moved slightly downward, due to the arc on which it travels. Therefore when the beveled face 16ª on the dowel 16 engages the beveled corner of the socket 22, the clutch member 20 must necessarily be elevated in the bearing 20ª to bring the socket 22 to a horizontal line with the dowel 16 and allow said dowel to enter said socket and the jaws 19 to enter the notches 18. Allowance for this upward movement is provided by the clearace 39 in the bearing 20ª as above described.

By the above described means of interlocking the two clutch members, the weight of the forward end of the driven shaft transmitting power to the rear of the engine, is carried entirely by the shaft 9 on the roller bearing 10 in the bracket 11, also the driven shaft is kept in true alignment while in operation, thereby eliminating vibration and providing a smooth and quiet running shaft.

The forward ends of the drive shafts 6 and 6ª are preferably connected with the clutch members 20 by suitable universal joints 40 of a type which will permit a forward and rearward movement of the clutch members 20 on said shafts to allow the clutch members to be thrown in and out of engagement. (See Figures 4 and 5.) A reach rod 42 has its forward end connected with the bracket 11, by a universal joint 43, its opposite end being connected to the differential housing in a similar manner.

Assuming that the parts are in the position shown in Figures 2 and 3, and it is desired to move the fire engine, the operator grasps the operating lever 24 and moves it to the left until it registers with the slot 27ª in the quadrant 27. This first operation of the lever swings the clutch member 20, at the forward end of the drive shaft 6, into line with the clutch member 17, the shaft 29 acting as a pivot. When the lever is moved rearwardly into the position shown in Figure 1, the clutch member 20 is moved forwardly until it engages with the clutch member 17 and said members are interlocked, as heretofore described. Power from the motor is then transmitted through the driven shaft 6 to the differential housing 4 and carrying wheels 3, thus starting the fire engine in a forward or rearward motion, as the case may be, depending, of course, upon the manipulation of the driving transmission in the transmission case 8. To stop the fire engine the operating lever is returned to its neutral position, or that shown in Figure 3.

If connection with the pumps is desired, the lever is moved to the right and back, thereby engaging the other clutch and starting the pumps. I am thus able, with a slight lateral and rearward movement of a single lever, to operate the shifter and easily and quickly engage either the differential or pump clutch member with the clutch member 17.

I have shown my invention applied to a fire engine, but it may be utilized for other purposes where a quick shift from one driven shaft to another is desired.

I claim as my invention:

1. The combination, with a frame having a traction means and a transmission shaft connection and clutch member therefor, of differential and driven shafts, a support for said differential and driven shafts adjacent said transmission shaft connection, clutch members connected with said differential and driven shafts for alignment and engagement with the clutch member of said transmission shaft connection, and a lever having a forward and backward and lateral movement and connected with said support for adjusting it in alignment with said transmission shaft clutch member and engaging the clutch members of said driven and differential shafts therewith.

2. The combination, with a frame having traction means and a transmission shaft connection provided with a clutch member, of differential and driven shafts mounted for adjustment alternately in alignment with said transmission shaft clutch member and provided with clutch members for engagement with said transmission shaft clutch member and a lever mounted to oscillate said differential and driven shafts laterally and move their clutch members forward and backward into or out of engagement with said transmission shaft clutch member.

3. The combination, with a frame having traction means and a transmission shaft connection provided with a clutch member, of differential and driven shafts having clutch members, a rock shaft supported in said frame and having means for connection with said differential and driven shafts to support the same, a lever pivotally connected with said rock shaft for oscillating it to shift said differential and driven shafts, said lever having a connection with the clutch members of said differential and driven shafts and mounted for movement independently of the oscillating movement of said rock shaft to shift said clutch members.

4. A traction machine comprising a frame having traction means and a transmission shaft connection provided with a clutch member, of differential and driven shafts, a yoke thereon, means connecting said rock shaft with said yoke for supporting said differential and driven shafts, clutch members for said differential and driven shafts, a lever connected with said clutch members and mounted to rock said shaft to adjust said clutch members in alignment with said transmission shaft connection and move said clutch members into and out of engagement with said transmission shaft clutch member.

5. The combination, with a frame having traction means and a transmission shaft connection provided with a clutch member, of differential and driven shafts, a yoke therefor, a rock shaft having a pivotal connection with said yoke and permitting lateral adjustment of said yoke to align said differential and driven shafts with said transmission shaft, clutch members for said differential and driven shafts, a lever having a forked end connected with said clutch members and mounted to rock said shaft to adjust said differential and driven shafts and engage their clutch members alternately with the clutch member of said transmission shaft.

6. The combination, with a frame having a traction means and a transmission shaft connection provided with a clutch member, of differential and driven shafts, a connecting yoke therefor, clutch members for said differential and driven shafts, a rock shaft mounted in said frame, a rod mounted in said yoke between said differential and driven shafts and having a pivotal connection with said rock shaft, a lever pivoted on said rock shaft and connected with said differential and driven shaft clutch members, lateral movement of said lever rocking said shaft to position said differential and driven shafts alternately in alignment with the clutch member of said transmission shaft and movement of said lever on its pivot in said rock shaft operating to move said differential and driven shaft clutch members into or out of engagement with said transmission shaft clutch member.

In witness whereof, I have hereunto set my hand this 31st day of March, 1922.

LEONIDAS P. STOREY.